Figure 1:
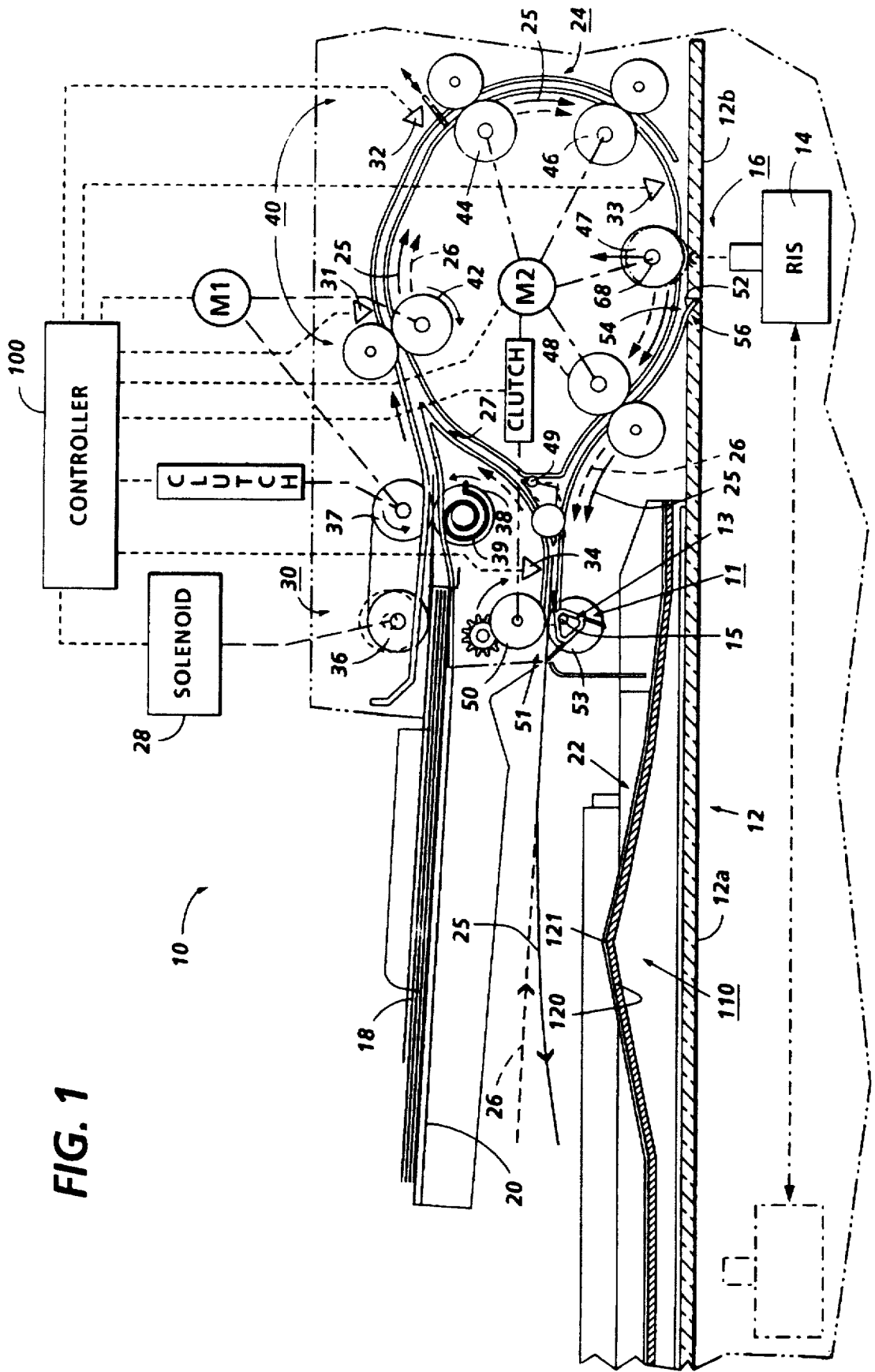

United States Patent [19]
Rubscha et al.

[11] Patent Number: 5,534,989
[45] Date of Patent: Jul. 9, 1996

[54] SEPARATING DOCUMENT TRAYS IMAGING SYSTEM

[75] Inventors: Robert F. Rubscha, Fairport; Margaret C. Tsai, Rochester; Mark H. Buddendeck, Macedon, all of N.Y.

[73] Assignee: Xerox Corporation, Stamford, Conn.

[21] Appl. No.: 485,952

[22] Filed: Jun. 7, 1995

[51] Int. Cl.⁶ .................................................. G03G 21/00
[52] U.S. Cl. ..................... 355/309; 355/316; 355/320; 355/321; 271/3.14; 271/4.01; 271/186
[58] Field of Search ..................... 355/308, 309, 355/316, 320, 321; 271/3.14, 4.01, 301, 65, 186, 209, 223, 207

[56] References Cited

U.S. PATENT DOCUMENTS

| | | | |
|---|---|---|---|
| 3,567,214 | 3/1971 | Crandell et al. | |
| 4,739,376 | 4/1988 | Kauekol | 359/309 X |
| 5,201,505 | 4/1993 | Shah | 271/3 |
| 5,250,981 | 10/1993 | Greene | 355/76 |
| 5,339,139 | 8/1994 | Fullerton et al. | 355/215 |
| 5,367,370 | 11/1994 | Yoshida et al. | 355/321 |
| 5,430,536 | 7/1995 | Fullerton et al. | 355/320 |
| 5,448,340 | 9/1995 | Ogiri et al. | 355/233 |
| 5,461,468 | 10/1995 | Dempsey et al. | 355/316 |
| 5,486,911 | 1/1996 | Rubscha et al. | 355/309 |

Primary Examiner—Matthew S. Smith

[57] ABSTRACT

A document imaging system for the imaging at a selected first or second imaging station of document sheets to be reproduced, including a pivotably mounted liftable automatic document handler with an integral input tray for the documents sheets, and a normally closely underlying output stacking tray into which the document sheets are ejected by the automatic document handler after imaging at the first imaging station for controlled stacking and retrieval, the second imaging station having a large imaging platen for the manual placement thereon of document sheets to be scanned, and a large manual platen cover normally overlying the large imaging platen, and pivotably mounted to be liftable for the manual placement of document sheets on the large imaging platen; wherein the output stacking tray of the automatic document handler is integrally formed in the upper surfaces of the large manual platen cover and not mounted to the automatic document handler, and the automatic document handler is liftable independently of the output stacking tray to provide clear access to the output stacking tray, yet wherein the automatic document handler is alternatively liftable together with the manual platen cover on a common or shared hinge line axis by a single lifting handle arrangement.

10 Claims, 4 Drawing Sheets

SEPARATING DOCUMENT TRAYS IMAGING SYSTEM

There is disclosed herein an improved, compact, dual mode imaging system in which document sheets can be fed to be imaged by an automatic document handler, or manually placed for imaging.

By way of background, it is very desirable to have a compact document handling and imaging system, and especially one which does not project or have parts extending outside of the footprint of the apparatus.

The disclosed exemplary embodiment provides for a compact and low cost but reliable document handling apparatus, with improved access to the output tray for the document sheets, and yet with a small overall machine footprint. It may be utilized for optically or electronically imaging document sheets, from one or both sides, in a optical or digital copier, scanner, and/or facsimile machine or a plural function combination thereof.

The disclosed embodiment is an improvement in dual mode electronic image input systems, with optional alternative automatic document feeding or optional manual document placement, such as that shown in Xerox Corp. U.S. Pat. No. 5,339,139 issued Aug. 16, 1994 to J. K. Fullerton, et al, and other art cited therein.

Further by way of background, some of the problems in the art with document tray positions and orientations or document access obstruction with overlaid trays are discussed in Xerox Corporation U.S. Pat. No. 5,201,505, issued Apr. 13, 1994 (D/91609). As indicated there, it is particularly desirable to have document handling systems which do not exceed the dimensions of even a small copier or scanner and are compact and lightweight. As noted there, although many simple document feeders involve at least one of the trays hanging off of or otherwise projecting out from one side of the copier or scanner, as in examples cited therein, it is desirable for the document feeder to have both the input and output (or restacking) trays located over the platen area, superposed relative to one another and the platen, for compactness. However, as stated in this '505 patent, when the two trays are this compactly superposed, the overlying tray can interfere with operator access to the underlying tray. The U.S. Pat. No. 5,201,505 attempts to solve this operator access problem to the underlying tray by severely cutting away or removing the supporting tray surface of the upper tray (which presents other difficulties).

As also further noted in the '505 patent, a fully horizontal restacking tray tends to restack sheets more unevenly than an inclined restacking tray. This is partially addressed in that patent by the initially upwardly inclined stacking surface 14c transitioning at 14d to a horizontal surface 14b downstream thereof in the restacking tray 14 of the '505 patent.

Figure 2:
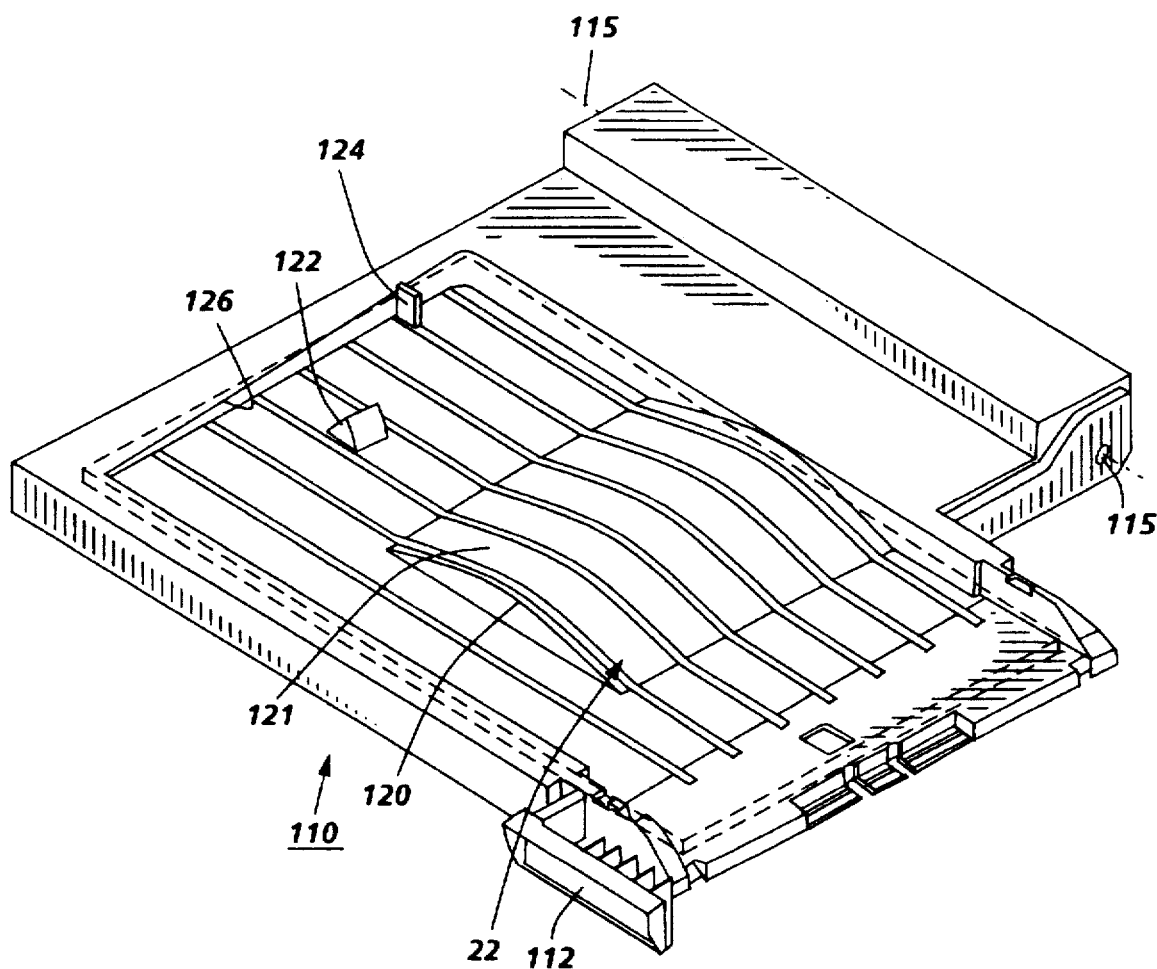

Further with regard to stacking assistance systems in general, and horizontal underlying stacking trays of document handlers in particular, there is noted U.S. Pat. No. 5,367,370 issued Nov. 22, 1994 to T. Yoshida, et al. In particular, there is noted the very large area "hump" occupying most of this document discharging tray 18, with oppositely inclined surfaces 18a and 18b transitioning at 18c, as shown in FIG. 2 thereof. As described in Col. 15 of the U.S. Pat. No. 5,367,370, the ascending inclination 18a rises in the direction in which the document is discharged and the descending inclination 18b continues thereafter. The vertex 18c is separated from a discharge port of the paper discharging unit in the document direction by more than one-half the maximum size of the document that can be used, e.g., more than one-half the length of A2 size paper in the lengthwise direction. As best as can be understood from the English utilized in this Col. 15 description, this tray 18 configuration of this '370 patent is to prevent the trailing ends of either large or small size documents from being separated from the discharge port by more than a predetermined distance, and by controlling the stacking positions of the trailing ends of the documents succeeding ejected documents are not caught under the preceding stacked documents and curled.

Note that in the U.S. Pat. No. 5,367,370 document handling system, as shown by the phantom lines in FIG. 1, the entire document handling unit, including all of the trays, must be lifted away from the platen to provide access thereto for alternative manual document placement and copying on the platen. This is typical.

Furthermore, as is also typical for many document handlers, effective optical background and holddown of such documents for manual copying is compromised by the use of the document feeding belt transport as the document holddown and imaging background surface even when the documents are not being moved. This has several disadvantages, including the uneven pressure distribution of the supporting rollers for the belt, and/or static electricity, and, especially, problems of dirt or contamination on the belt. In operation such transport belts become dirty and thus do not provide a fully uniform or white imaging background around or behind the document being imaged. This can cause undesirable edge printout or print-through of such contamination on copies or reproductions of the document being imaged. Accordingly, it is preferable to have manual copying, especially of thin, translucent, large, and/or delicate documents, done on an imaging system with a stationery platen cover specifically designed for that purpose rather than alternatively used as a moving document transport. For example, as in U.S. Pat. No. 5,250,981 cited below.

Of further background interest, Xerox Corporation U.S. Pat. No. 5,250,981, issued Oct. 5, 1993 to Harold Greene, discloses a pivotable manually liftable platen cover for a copier or scanner for holding the document on the platen when closed down in its normal position overlying the platen. An integral document retaining pocket is provided on the upper surface of this platen cover, which includes integral springs which retain the document in this pocket when the platen cover unit is raised. However, no automatic document feeding is disclosed.

Of further background interest is the Xerox Corporation automatic document feeder, or ADF, accessory for the Xerox Corporation "2400" and "3600" copiers, for automatic document feeding and ejection of the originals and for stacking them allegedly neatly on top of the parent duplicator body, as indicated in a sales brochure thereon. This product is believed to be essentially the same as or similar to what is disclosed in Xerox Corporation U.S. Pat. No. 3,567,214, issued Mar. 2, 1971 to M. G. Crandell, et al. Note, however, that in this system the documents are fed into a document transport belt system running under the platen cover, and the documents are fed by this transport belt from one side of the platen to the other and ejected onto a surface 14 which is not overlying the platen 10. It is a separate surface 14 on this large area copier which does not appear to be specifically configured as a document stacking tray. Also, this document handler unit itself is extending outwardly from the other side of the imaging platen transport 22. Also, the document input tray 12 thereof is not overlying the platen 10 either, and thus this tray does not present any restriction to or interference with the raising of the platen cover for this system of U.S. Pat. No. 3,567,214.

The disclosed system overcomes the above and other problems. It is compatible with various above design constraints and desired document handling features.

More specifically, features disclosed in the specific exemplary embodiment herein include a document imaging system for the imaging at a selected first or second imaging station of document sheets to be reproduced, including a pivotably mounted liftable automatic document handler with an integrally lifted input tray for said documents sheets to be loaded into and automatically fed from said input tray to said first imaging station, and a normally underlying output stacking tray into which said document sheets are ejected by said automatic document handler after imaging at said first imaging station for controlled stacking and retrieval, said second imaging station comprising a large imaging platen for said manual placement thereon of document sheets to be scanned, and a large manual platen cover providing a document hold down lower surface normally overlying said large imaging platen, which platen cover is pivotably mounted to be liftable for said manual placement of document sheets on said large imaging platen; wherein said output stacking tray of said automatic document handler is integrally formed in said upper surfaces of said liftable large manual platen cover and is not mounted to said automatic document handler, and said output stacking tray is normally extending to closely adjacent to said automatic document handler; and wherein said automatic document handler is liftable independently of said output stacking tray in said manual platen cover to provide clear access to said output stacking tray, but wherein said automatic document handler is also liftable together with said manual platen cover.

Further disclosed features of the exemplary embodiment herein include, individually or in combination, those wherein said output stacking tray is normally closely overlaid by said input tray of said automatic document handler unless said automatic document handler is independently lifted away from said output stacking tray and said manual platen cover; and/or wherein said input tray of said automatic document handler is normally superposed over said output stacking tray with both said input and output trays compactly overlying said second imaging station; and/or wherein said input tray of said automatic document handler is normally closely superposed over said output stacking tray to define a confined space therebetween providing a document reversal chute; and/or wherein said automatic document handler with said integral input tray is independently pivotally mounted to said document imaging system, and said platen cover with said integral output stacking tray is also independently pivotally mounted to said document imaging system, on a common pivot axis line; and/or wherein a dual lifting system is provided for manually pivotally lifting said automatic document handler together with said said platen cover at a first single manual lifting position, and for separately lifting said automatic document handler without lifting said platen cover at a second manual lifting position spaced from said first single lifting position; and/or wherein said platen cover has a frontally projecting outer handle and said automatic document handler has a frontally projecting inner handle which is held and lifted by said outer handle to lift said platen cover and said automatic document handler together as a single unit; and/or wherein said output stacking tray includes vertically extending sheet stacking assistance surfaces therein integrally molded into said upper surfaces of said large manual platen cover; and/or wherein said integrally molded in sheet stacking assistance surfaces include at least one a stacking end stop and at least one smoothly transitioning large area stacking assistance hump within said output stacking tray between said automatic document handler and said stacking end stop.

In the description herein the term "document" or "sheet" refers to a usually flimsy sheet of paper, plastic, or other such conventional individual image substrate, and not to microfilm or electronic images which are generally much easier to manipulate. The "document" is the sheet (original or previous copy) being imaged. A "simplex" document (or copy sheet) is one having its image and page number on only one side or face of the sheet, whereas a "duplex" document (or copy sheet) has "pages", and normally images, on both sides, i.e., each duplex document is considered to have two opposing sides, faces, or "pages" even though no physical page number may be present.

As to specific hardware and electrical components in connection with embodiments of the subject apparatus, or alternatives therefor, it will be appreciated that, as is normally the case, some such specific hardware components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background.

In particular, the embodiment disclosed herein of an imaging system and an exemplary automatic document feeder therefor in which the present system for overcoming these and other problems may be utilized is similar to that disclosed in the above-cited U.S. Pat. No. 5,339,139, issued Aug. 16, 1994 to Jack K. Fullerton, et al, and copending commonly assigned U.S. application Ser. No. 08/332,054 filed Oct. 31, 1994 (Attorney Docket No. D/94499).

Figure 3:
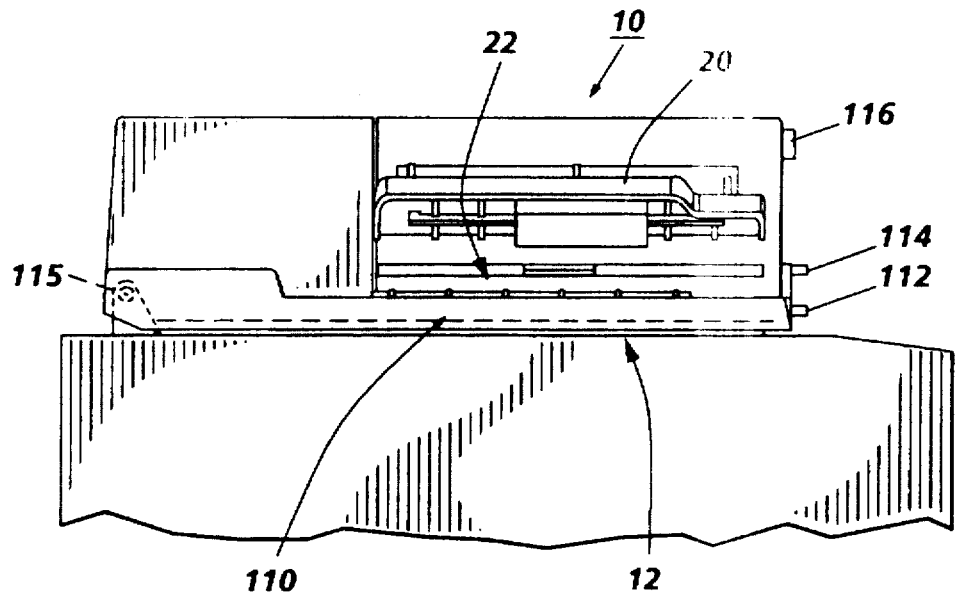
Figure 4:
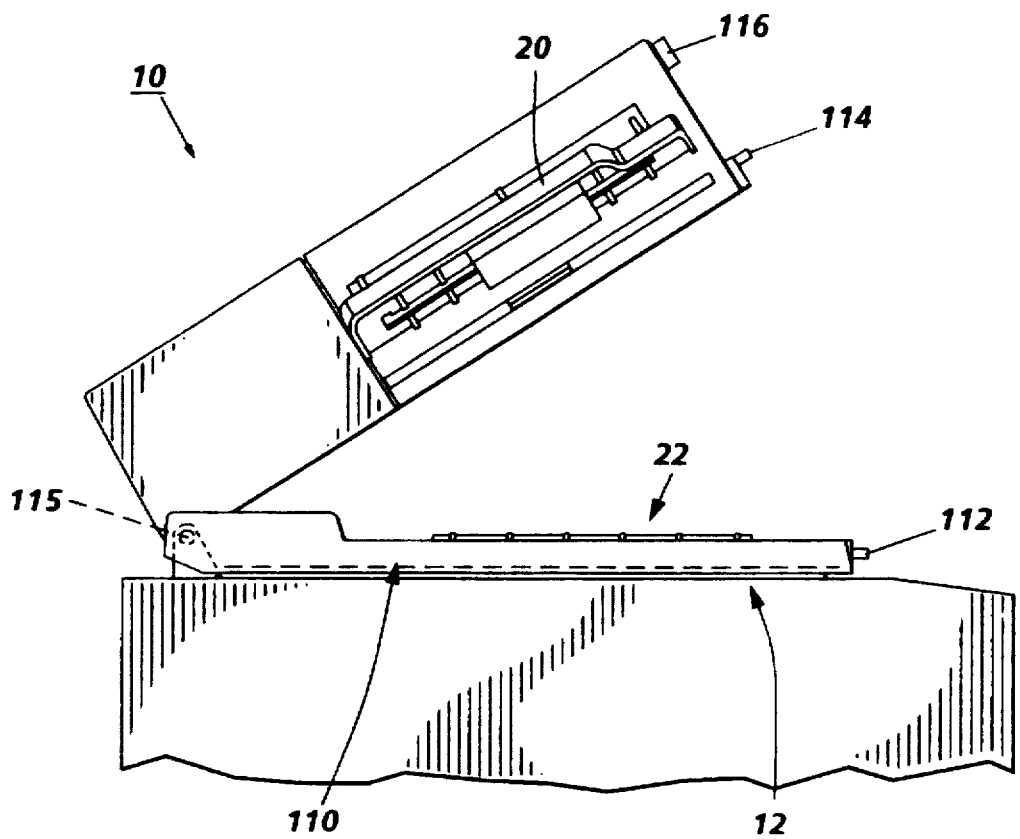
Figure 5:
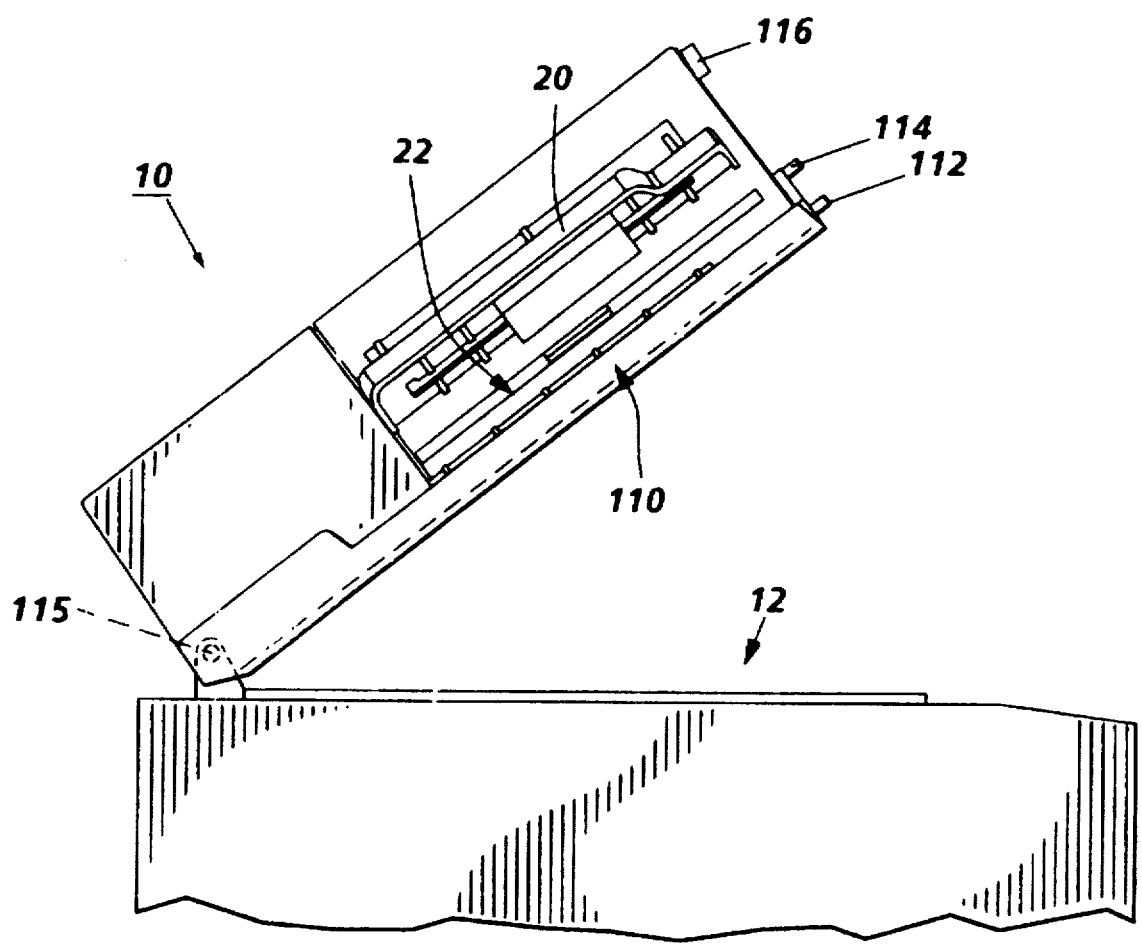

Various of the above-mentioned and further features and advantages will be apparent from the specific apparatus and its operation described in the example below, as well as the claims. Thus, the present invention will be better understood from this description, including the drawing figures (substantially to scale) wherein:

FIG. 1 is a front view of one embodiment, with a left end portion not full shown for drawing space reasons, of an exemplary imaging system including a liftable automatic document handling system at a first imaging station on the right (schematically, with covers removed), and an adjacent manual document placement imaging station on the left, and a large liftable platen cover for the latter containing an integral sheet stacking exit tray for the former, both in their normal, down, positions; and FIG. 2 is a perspective view of the exemplary liftable large platen cover, with the integral sheet stacking exit tray in the upper surfaces thereof, of FIG. 1;

FIG. 3 a left end view of the embodiment of FIGS. 1–2, in the same normal, imagining, position;

FIG. 4 is the same left end view of the embodiment of FIGS. 1–3, but with only the automatic document feeding unit lifted, to fully expose the document tray on the platen cover; and FIG. 5 is the same left end view of the embodiment of FIGS. 1–4, but with both units lifted up as a unit, as will be described.

Describing now in further detail the exemplary embodiment with reference to the Figures, there is shown an exemplary dual mode document imaging system, including an automatic document handling or feeding (ADH or ADF) system or unit 10, as one example of the subject system, to be further described herein.

This exemplary document handling system example 10, and its exemplary imaging system, as further disclosed in the cited U.S. Pat. No. 5,339,139, includes a desirably compact automatic document feeding document path. It also in this example optionally provides "immediate" type duplex document inversion with the duplex sheet inverter chute path located over the top of the stack in the return or exit tray and under the input tray. This highly compact and lightweight document handler 10 may be a part of an optional or add-on top module of a convertible digital copier/printer/scanner unit, or a stand-alone document scanner. A platen 12 is provided with a large platen portion 12a, which may be scanned by a rastor input scanner or RIS 14. The exemplary RIS 14 here may be, e.g., a diode type full width array of a conventional type for high resolution, scanning closely under the platen. The entire scanner or input module, including the platen 12 and the RIS 14 may be a removable top module so that the underlying processor or printer unit may alternatively be used as a stand alone or remote digital printer for remote electronic input. With the top module, including the document handler 10, mounted on a digital printer unit, the integrated unit provides a fully integrated convenience copier which even a casual operator may use simply by placing documents 18 in an upper document input tray 20 and automatically copying them at an imaging station 16 as if this were a normal light lens copier rather than a digital copier. Alternatively, the same document input at imaging station 16 (or platen portion 12a) provided here may also be used for facsimile transmissions. In that case the documents 18 will be similarly electronic imaged by RIS 14, but then transmitted over communications media, with or without electronic storage or buffering. Only the relevant portions of the imaging module and its document handler 10 need be illustrated here since the digital printer or copy processor on which it may be mounted may be any of various known, conventional, or new electronic printer units, which therefore need not be described.

Here there is shown a two part imaging platen 12 comprising a full size scanning platen portion 12a and a narrow slit scanning portion 12b. As may be seen, these two platen portions 12a and 12b are preferably closely adjacent one another and in the same plane and utilize the same frame mounting and/or alignment system.

The two document trays 20, 22 for the ADH 10 both desirably overlay the platen portion 12a rather than extend the machine footprint. However, as will be further described herein, the document sheets output tray 22 of the automatic document feeder unit 10 is integrated into the upper surfaces of a platen cover unit 110 which is normally overlying the non-automatic document copying platen area 12a, while the document input tray 20 is part of, and lifts with, the ADH 10 instead.

The same RIS 14 in this example may be utilized for scanning documents manually placed on the large platen portion 12a as well as documents which are automatically fed to be imaged on platen portion 12b by the document handler 10. That is, the same RIS and electronics may be utilized for both a first and second imaging station, one at 16 in platen area 12b for automatic moving document handling and another on large platen area 12a for manual document handling and stationary imaging of the document with no risk from mechanical document feeding, while the entire document is held down by a large manual copying platen cover 110. Conventionally, the lower surface of cover 110 is a smooth white imaging background surface, backed by a foam pad, to hold a document sheet flat against the large platen area 12a.

The platen cover 110 here is liftable by a forward projecting graspable handle 112. This handle 112 is a special handle which underlies, and can also lift therewith, an inner handle 114. The inner handle 114 is not connected to the cover 110. It is connected to lift the ADH unit 10 when handle 112 is lifted. The unit 10 can be lifted independently, or both units can be lifted together as a single unit by lifting handle 112. To allow this, the ADH unit 10 and the large platen cover unit 110 for manual copying (with exit tray 22) are independently pivotally mounted (with conventional counter-spring hinge mountings) to the rear of the machine, but are both hinged on substantially the same pivot axis 115, and in the same approximate plane as the platens 12a, 12b, for operator lifting from their fronts.

These two liftable components 10, 110, are directly adjacent, side by side, but, as described and shown, can "split" to be separately liftable. Lifting the ADH 10 but not the platen cover 110, as in FIG. 4, which could be by lifting the ADH 10 at another lifting area 116 thereon, provides full, clear, access to the output tray 22 by lifting away the input tray 20, which is integral the ADH 10, but not the output tray 22, which is integral the other unit 110. Alternatively, lifting both units 10, 110 together, as in FIG. 5, such as with the integral handle 112, exposes the entire platen 12a and 12b.

Normally, the document input tray 20 here is closely superimposed above the document output tray 22, i.e., when both pivoted units 10, 100 are down in their normal positions against the platen. That is, these two trays closely overlay one another in the operation of the ADH 10 to form a relatively enclosed space between the two trays, as will be further described. This close space between the two trays 20 and 22 provides a protective and space saving inverter chute for duplex documents which are being inverted between the copying of their first and second sides. Yet, here, both trays are readily operator accessible.

Referring particularly to FIG. 2, the output tray 22 here is molded into the platen cover 110 upper surface. This tray 22 here also preferably includes a first large, wide, stacking assistance hump 120, for letter size sheets fed out long edge first, which may also resist buckling of sheets feeding into tray 22, with the peak 121 of the hump 120 being approximately adjacent the outer ends of such stacked letter size sheets. The tray 22 here also includes a second small narrow central stacking assistance hump 122 for larger documents. E.g., a transverse sheet-buckle forming hump 122 so that short edge fed 17" sheet corners will be caught by the tray end wall. This second hump 122 may serve another function here, as an end stop for 14" sheets fed short edge first (lengthwise). Also shown in this particular tray 22 example is an end stop rib 124 at one side of a curved tray 22 end wall 126, for providing an orthogonal end stop line for 17" large documents without requiring a straight orthogonal end wall. All of the tray elements 120, 122, 124 are respectively spaced in that order in the document ejection or feeding direction from the ADH 10 exit nip 51, which is right to left in FIGS. 1 an 2.

The disclosed constant velocity transport (CVT) system for the automatic document handler 10 includes a driven over-platen roller 47, all three CVT document feeding rollers, 46, 47 and 48 may be commonly driven by the same motor, such as servo motor M2, at the same speed, while the document is being imaged. The pre and post platen document feeding roller surfaces 46, 48 may, if desired, be metallic drive rollers, grit blasted, for increased long term drive radius stability and velocity control as compared to conventional elastomer document feeding surfaces. The document handler 10 feeds documents to be imaged at a constant velocity with this CVT system past a scanning or slit image station 16 which is at the slit scanning platen portion 12b, as shown. For this document handler 10 document imaging, the RIS 14 is "parked" at this imaging station 16.

Documents 18 may be loaded face up in normal order in the document input tray 20 of the document handler 10 when automatic document input is desired. The stack of documents is then sequentially fed from the input tray 20 through a short, highly compact, "U" shaped document path 24 for imaging at the imaging station 16, and then after one imaging the simplex documents are fed directly on to a document output tray 22 in which the documents are restacked face down. However, as will be described, there is a partial difference in the document paths provided for simplex documents as compared to duplex documents. This is illustrated here by solid arrows representing the simplex document path 25 and dashed line arrows representing the duplex path 27. Note, however, that both simplex and duplex documents are ejected and restacked in the same document output tray 22 here, in the same manner, after their copying is completed.

All of the document sheet feeding in the document path 24, including the duplex document path 27 portions, and the imaging station 16, are all provided in this example by only two servo drive motors, a first drive motor M1 and a second drive motor M2, respectively connected to the various document path sheet feeders as illustrated by the illustrated connecting dashed lines. Both of the drive motors M1 and M2 and a solenoid 28 (for selectively lifting the nudger roll of the input feeder), and the clutches, are controlled by a conventional programmable microprocessor controller 100. Servomotor M2 has a conventional integral or shaft connected encoder providing pulse signals in proportion to its rotation to a servo controller which may be part of the controller 100. Also connecting with the controller 100 in a conventional manner are sheet path sensors for detecting the lead and/or trail edge of document sheets being fed through the document paths 24, 27 such as the illustrated sensors 31, 32, 33, and 34. Thus, these sheet path sensors provide signals to the controller as to the present document position, when the respective sensor is activated. Because the document sheet or a portion thereof is thus known to be in a particular feeding nip moving it at a known speed, its position and movement distance can be predicted in advance in the controller 100 in a known manner, once the sheet is fully acquired in the non-slip document path.

An exemplary top sheet separator/feeder 30 here sequentially feeds the top sheet of the stack of documents loaded in the input tray 20 into the U shaped document path 24, and separates each fed sheet from the respective underlying sheets. The sheet separator/feeder 30 may be driven by the motor M1, as shown. A nudger roll 36 is lowered by solenoid 28 onto the top of the stack for feeding or advancing the top sheet or sheets 18 into a positive retard separating nip, comprising a driven first feed roll 37 and an undriven retard roll 38. The driven feed roll 37 rotates to feed the top-most sheet at that point in time downstream into the document path 24, while subsequent or underlying sheets are retarded by the frictional retard roll 38 forming a nip therewith. To prevent wear spots or the like on the retard roll 38, the roller 38 is allowed some limited rotational movement forward or downstream. However, this roller 38 downstream rotation is resisted by a connected return spring 39, which spring 39 is wound up by roller 38 downstream rotation due to the high friction between rollers 37 and 38 when they are directly engaged (with no sheets therebetween). Whenever two or more sheets are in the retard nip between the rolls 37 and 38, the wound-up return spring 39 force is strong enough to overcome the (lesser) friction between the plural sheets in the nip, to push back upstream the underlying sheets, providing improved separation as further explained in the above-cited references. Once the top sheet has been fully acquired and fed downstream past the adjacent feeder output sensor 31, the nudger 36 may be lifted to prevent inadvertent further feeding therewith of an underlying sheet, and prevent smearing of document images.

Once a top sheet has been separated and fed into the document path 24 as described above, it then enters the regular document path sheet drive system 40. This will be described here with reference to the driven rollers, although the mating and nip-defining idler rollers are also illustrated. As shown, these document path sheet drive rollers of this example comprise, in order: second or take-away rolls 42, registration rollers 44 substantially spaced downstream thereof, with an intermediate sheet deskew buckle chamber area therebetween, then first CVT rolls 46, then an imaging station 16 with a platen overlying sheet holddown CVT roller 47, then third CVT rolls 48, and then (after passing a pivotal gate 49) reversible exit nip rolls 50 at the entrance to the output tray 22.

Before the document is fed into the CVT transport path portion it may be lead-edge deskewed by slightly buckling the sheet with its lead edge against a squarely transverse or perpendicular surface. Here, merely by way of an example, against the illustrated gate (with movement arrows) upstream of the rollers 44 (or, alternatively, temporarily stopping that same nip). When the gate is released, the lead edge is captured in the nip 44 squared or deskewed. It is not necessary to open upstream feed nips for this.

The illustrated imaging station CVT roller 47 may be gravity or spring loaded against the platen, and may also provide, or be associated with, an imaging background surface for appropriate image background for the document being imaged at that point. It provides the control of the document being imaged to maintain all of document within the depth of field and focus of the imaging system as the document passes through the imaging station, i.e., to maintain a uniform restricted (very narrow height) maximum spacing gap above the imaging plane at the platen upper surface, of, e.g., less than 0.5 mm.

There is also shown here a platen gap 54 by a beveled platen edge 56 on the main or full size platen portion 12a end which is facing 12b, as shown. As described in more detail in the U.S. Pat. No. 5,339,139, this provides a space or groove extending below the upper surface of the platen portion 12b into which a small baffle lip or catch 52 may be desirably attached to edge 56. The baffle lip 52 extends above and below the upper surface of the platen portion 12b over which documents are being fed for imaging at the imaging station 16. Thus, the lead edge of documents fed through the imaging station 16 over the platen 12b upper surface are positively caught and deflected upwardly into the next feed nip.

Turning now to the exemplary output and duplex document handling system, a gate 49 is located at the downstream end of the U-shaped document path 24, just upstream of the reversible exit nip rolls 50 and at the entrance of the duplex document path 27. The gate 49 does not obstruct documents coming from the imaging station 16, irrespective of whether they are duplex or simplex documents. All documents here go directly past the imaging station 16 into the nip of the exit rolls 50. Simplex documents are desirably fed on by these rolls 50 without any reversal thereof out into the exit tray 22 for restacking there in proper collated page order. These documents stack face down in 1 to N order, if the documents were fed face up in 1 to N order from the input tray 20 and were inverted once in the U-shaped document path 24.

However, for duplex documents which have been imaged on their first side and are yet to be imaged on their second side, as soon as the trail edge of the duplex document passes the sensor 34, the controller 100 directs the reversal of the exit rolls 50. The duplex document sheet at that point is, as shown, extending substantially (for most of its length) out into the above described inverter chute space between the trays 20 and 22. That duplex document sheet may now be rapidly reversed (feeding much faster than the CVT velocity) to be drawn back into the document handler toward the gate 49 by reversing rollers 50 at that point. The gate 49 is either solenoid or cam actuated or gravity loaded at this point into a position in which, as shown in phantom, the reversed duplex document is directed up into the duplex path 27. This duplex path 27 forms a return path of the duplex documents back into the entrance of the U-shaped path 24.

While the document sheet is being driven forward by the CVT drive system of M2 driving lower rolls 44, 46, 47 and 48 forward, the output roller 50 in that same path is desirably also driven forward by M2 at the same speed. However, when a duplex document is to be reversed, this may preferably be done by a clutch disconnecting the roller 50 shaft from M2, and then a simple reverse gear drive of the roller 50 shaft may be electrically clutched in at that point, as illustrated, to motor M1, while M1 continues to drive forward (downstream) the upper rollers 42 towards which the reversed document is fed by M1 reverse driven roller 50. To express it another way, for reversing, the clutch between roller 50 and M2 is disengaged and the clutch from M1 to the reverse gear drive for roller 50 is engaged. (Alternatively, a separate motor may be provided, if desired.) Note that for long duplex documents, this allows the trail end of the long duplex document to still be reverse fed out of roller 50 while the front end of that long document is already at the same time being fed forward through the CVT system for imaging by rollers 46, 47 and 48 driven forward by M2.

The combined duplex documents path 24, 27 provides a complete loop, as may be seen. This complete duplexing loop 24, 27 is quite small and compact. Desirably, it has dimensions only slightly larger than that of the longest document dimension to be fed therethrough. That is, this system is operative as long as the trail edge of the duplex document being inverted clears the sensor 34 before the lead edge of that same document sheet returns to the sensor 34 through the loop path 27, 24 after having its second side imaged at the imaging station 16.

This refeeding of duplex document sheets through the path 27 and 24 for second side imaging turns those document sheets over a second time. For proper collated output into the output tray 22, the duplex documents may be reinverted before restacking by being again fed back through the same path 27, 24 in the same manner, utilizing the same reversal of the exit rolls 50, but passing through without imaging, and then ejected (by not reversing the exit rolls 50). Thus, the duplex document is then ejected, properly oriented face down, into the output tray 22. Face down output for duplex documents is, of course, with the first or odd side page down, since this is a 1 to N system.

Referring to the duplex document scanning sequences available, the simplest sequencing algorithm is to process all documents in a simple 1 to N sequence, including "immediate duplex" sequencing of duplex originals. That is, side 2 of each duplex document may be scanned directly after side 1, followed by side 1 of the next fed document, etc. [Thus, one does not have to have 2 sheets in a document path at once.] The duplex document scanning sequence here may thus be side 1 of 1, skip, side 2 of 1, skip, side 1 of 2, skip, etc., relative to a normal inter-document gap for simplex documents feeding in this example of approximately 30 mm. Each "skip" is for inverting the document by reversal of the exit rolls 50 to feed that sheet back through the clockwise CVT path loop again; first for imaging its second side, and then for a non-imaging pass of the document sheet for re-inverting it again for proper output stacking. There is no need for deskew, constant velocity, or slowing down for CVT scan in this non-imaging pass. Thus, this third, non-imaging, document loop pass is desirably at a substantially higher (slew rate) velocity, to save time and increase overall duplex productivity. (However, the short path, simple drives and close document spacing may not allow that.) As noted, after the duplex sheet is fed through the document path for the third time, it returns back to the reversible exit rolls for the last time and is ejected to stack in collated order. However, it will be appreciated that there are other document sequencing alternatives.

A simple low cost undriven or passive device or element 11 may be provided at the sheet exit nip, as shown. The unit 11 here is a small three armed sheet separator in the sheet exit nip 51 area, which is driven only by the moving paper sheet itself, yet can correct sheet handling problems. The integral, unitary or monolithic single piece device 11 illustrated here has three extending rigid arms or fingers, which three arms may be identical. It may be made as a small and relatively thin molded plastic part. One or more such separating devices 11 can be used, spaced transverse the paper path.

A unique mounting is provided for the sheet separating device 11. The triangular shape of its large mounting hub or aperture 13 automatically normally positions the three armed sheet separator 11 with one arm semi-vertically in the exit nip paper path. As a sheet is fed up to rollers 50 and then through the exit nip 51, that one arm is driven downstream by the moving sheet lead edge. This sheet induced motion causes rotation and then translation of the device 11 eccentrically on its triangular hub 13 about its mounting shaft 15. This movement of the device 11 causes an arm to guide in the incoming sheet above the prior sheets already stacked in the exit tray 22, and also to knock off any sheets hung up on the exit nip idler roll 53. This cycle repeats for the next entering sheet and so on. Each incoming sheet partially rotates the device 11.

The device 11 always initially rotatably re-positions itself by gravity in one of its three predetermined positions, due to its large triangular or trapezoidal center aperture 13. Thus, at least one of the fingers is always positioned to provide separation, and also to keep the prior sheet from being reacquired by the exit nip 51 when a sheet is reversed in that nip.

While the embodiment disclosed herein is preferred, it will be appreciated from this teaching that various alternatives, modifications, variations or improvements therein may be made by those skilled in the art, which are intended to be encompassed by the following claims:

What is claimed is:

1. A document imaging system for the imaging at a selected first or second imaging station of document sheets to be reproduced, including a pivotably mounted liftable automatic document handler with an integrally lifted input tray for said documents sheets to be loaded into and automatically fed from said input tray to said first imaging station, and a normally underlying output stacking tray into which said document sheets are ejected by said automatic document handler after imaging at said first imaging station for controlled stacking and retrieval, said second imaging station comprising a large imaging platen for manual placement thereon of document sheets to be scanned, and a large manual platen cover providing a document hold down lower surface normally overlying said large imaging platen, which platen cover is pivotably mounted to be liftable for said manual placement of document sheets on said large imaging platen; wherein said output stacking tray of said automatic document handler is integrally formed in said upper surfaces of said liftable large manual platen cover and is not mounted to said automatic document handler, and said output stacking tray is normally extending to closely adjacent to said automatic document handler; and wherein said automatic document handler is liftable independently of said output stacking tray in said platen cover to provide clear access to said output stacking tray, but wherein said automatic document handler is also liftable together with said manual platen cover.

2. The document imaging system of claim 1, wherein said output stacking tray is normally closely overlaid by said input tray of said automatic document handler unless said automatic document handler is independently lifted away from said output stacking tray and said manual platen cover.

3. The document imaging system of claim 1, wherein said input tray of said automatic document handler is normally superposed over said output stacking tray with both said input and output trays compactly overlying said second imaging station.

4. The document imaging system of claim 1, wherein said input tray of said automatic document handler is normally closely superposed over said output stacking tray to define a confined space therebetween providing a document reversal chute.

5. The document imaging system of claim 1, wherein said automatic document handler with said integral input tray is independently pivotally mounted to said document imaging system, and said platen cover with said integral output stacking tray is also independently pivotally mounted to said document imaging system, on a common pivot axis line.

6. The document imaging system of claim 5, wherein a dual lifting system is provided for manually pivotally lifting said automatic document handler together with said said platen cover at a first single manual lifting position, and for separately lifting said automatic document handler without lifting said platen cover at a second manual lifting position spaced from said first single lifting position.

7. The document imaging system of claim 1, wherein said platen cover has a frontally projecting outer handle and said automatic document handler has a frontally projecting inner handle which is held and lifted by said outer handle to lift said platen cover and said automatic document handler together as a single unit.

8. The document imaging system of claim 1, wherein said automatic document handler with said integral input tray is independently pivotally mounted to said document imaging system, and said platen cover with said integral output stacking tray is independently pivotally mounted to said document imaging system on a common pivot axis line, and wherein a dual lifting system is provided for manually pivotally lifting said automatic document handler together with said platen cover at a first single manual lifting position, and for separately lifting said automatic document handler without lifting said platen cover at a second manual lifting position spaced from said first single lifting position; and wherein said platen cover has a frontally projecting outer handle and said automatic document handler has a frontally projecting inner handle which is held and lifted by said outer handle to lift said platen cover and said automatic document handler together as a single unit.

9. The document imaging system of claim 1, wherein said output stacking tray includes vertically extending sheet stacking assistance surfaces integrally molded into said upper surfaces of said large manual platen cover.

10. The document imaging system of claim 9, wherein said sheet stacking assistance surfaces include at least one stacking end stop and at least one smoothly transitioning large area stacking assistance hump within said output stacking tray between said automatic document handler and said stacking end stop.

* * * * *